US009070325B2

(12) United States Patent
Hyytiainen

(10) Patent No.: US 9,070,325 B2
(45) Date of Patent: Jun. 30, 2015

(54) REFLECTIVE AREA BLOCKING FEATURE FOR DISPLAYS

(75) Inventor: Ilkka Hyytiainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 690 days.

(21) Appl. No.: 12/680,953

(22) PCT Filed: Oct. 4, 2007

(86) PCT No.: PCT/EP2007/060569
§ 371 (c)(1),
(2), (4) Date: Mar. 31, 2010

(87) PCT Pub. No.: WO2009/043382
PCT Pub. Date: Apr. 9, 2009

(65) Prior Publication Data
US 2010/0220096 A1    Sep. 2, 2010

(51) Int. Cl.
*G09G 3/34* (2006.01)
*G02F 1/1335* (2006.01)
*G02F 1/1362* (2006.01)
*G09G 3/36* (2006.01)

(52) U.S. Cl.
CPC ........ *G09G 3/3406* (2013.01); *G02F 1/133514* (2013.01); *G02F 1/133555* (2013.01); *G02F 1/13624* (2013.01); *G09G 3/3611* (2013.01); *G09G 2300/0456* (2013.01)

(58) Field of Classification Search
CPC ......... G09G 3/34; G09G 3/3406; G09G 3/36; G09G 2300/0456; G09G 2300/046; G09G 2320/062; G09G 2320/0626; G09G 2320/08; G09G 2360/141; G09G 2360/144

USPC .......... 345/84, 87–90, 93, 98–100, 102–103, 345/108, 207, 214, 694–695; 349/61–64, 349/67–68, 113–114, 139, 141–144, 193
See application file for complete search history.

(56) References Cited

U.S. PATENT DOCUMENTS

| 2004/0223100 A1* | 11/2004 | Kotchick et al. ............... 349/114 |
| 2005/0140641 A1* | 6/2005 | Kim et al. ...................... 345/102 |
| 2006/0044239 A1 | 3/2006 | Kamijo et al. .................. 345/88 |
| 2006/0139527 A1* | 6/2006 | Chang et al. ................... 349/114 |
| 2006/0209002 A1* | 9/2006 | Uchikawa ...................... 345/102 |
| 2008/0007679 A1* | 1/2008 | Ochiai et al. ................... 349/114 |

(Continued)

FOREIGN PATENT DOCUMENTS

| WO | WO 2004/072716 A1 | 8/2004 | |
| WO | WO 2006/038192 | * 4/2006 | ............... G09G 3/36 |
| WO | WO2006/038192 | * 4/2006 | ............... G09G 3/36 |

(Continued)

*Primary Examiner* — Temesgh Ghebretinsae
*Assistant Examiner* — Keith Crawley
(74) *Attorney, Agent, or Firm* — Harrington & Smith

(57) ABSTRACT

This invention relates to a display device, a method, a computer program and a system including a display device, wherein said display device includes at least one light transmissive area configured to be coupled to a light source in order to be provided with backlight, at least one light reflective area, at least one light transmission control element associated with said at least one light reflective area, wherein said display device is configured to be switched into a reflective blocking state when said at least one light transmissive area is provided with backlight, and wherein in said reflective blocking state said at least one light transmission control element causes light-blocking.

28 Claims, 8 Drawing Sheets

(56) References Cited

U.S. PATENT DOCUMENTS

2008/0055519 A1* 3/2008 Battersby et al. ............... 349/68
2008/0117346 A1* 5/2008 Jepsen ........................... 349/42

FOREIGN PATENT DOCUMENTS

| WO | WO 2006/038192 A2 | 4/2006 |
| WO | WO 2006/038192 A3 | 4/2006 |

* cited by examiner

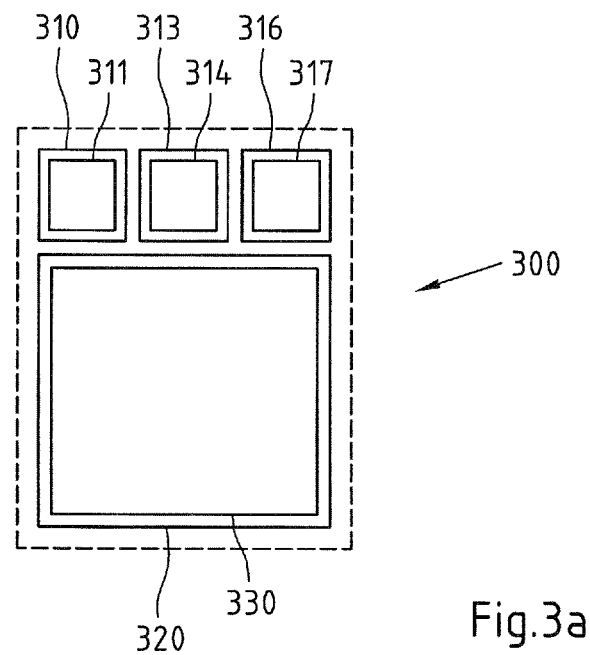
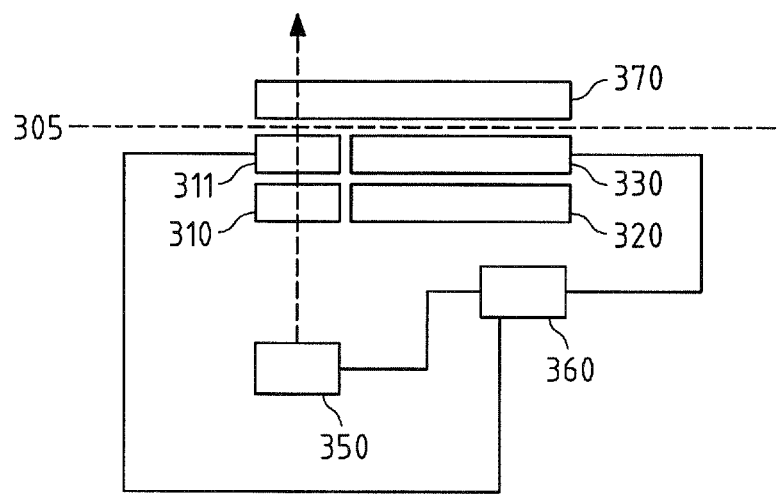
Fig.3a
Fig.3b

US 9,070,325 B2

REFLECTIVE AREA BLOCKING FEATURE FOR DISPLAYS

FIELD OF THE INVENTION

This invention relates to a device, a method, a computer program and a system comprising a device, wherein said device comprises at least one light transmissive area and at least one light reflective area.

BACKGROUND OF THE INVENTION

Liquid Crystal Displays (LCDs) are used in a variety of electronic devices like mobile phones, handhelds, pocket computers or the like in order to display images to a user.

Such LCD displays are often configured to be used in two different modes: In a first mode, the LCD is illuminated by means of a backlight, and in a second mode, said backlight is switched off and only ambient light is used to illuminate the LCD. For instance, said second mode is used in a standby mode of a mobile phone in order to reduce power consumption, and when a user activates the mobile phone, then the backlight is switched on and the LCD is driven in the first state in order to display brilliant color images.

Such a two-mode LCD may comprise a separate light reflective region area 120 and a separate light transmissive area 110 per each pixel, as depicted in FIG. 1a. A backlight 150 is deposited on the back side of the light transmissive area 110 so that light emitted from the backlight 150 can pass through the transmissive region 110, the liquid crystal layer 130 and the transparent upper electrode 140. The reflective region 120 may comprise a reflective layer 121 so that ambient light entering from the observer side of the display may go through the LCD (i.e. the transparent upper electrode 140 and the liquid crystal layer 130) in order to be reflected at a reflective layer 121 of the light reflective area 120 and then the reflected light goes through the LCD again, as depicted on the right hand side of FIG. 1a. As the material of the transparent upper electrode 140, for example, ITO (Indium Tin Oxide) can be used.

Both the light transmissive area 110 and the light reflective area 120 may comprise a controllable electrode 112,122 in order to control the light transmittance of the adjacent part of the liquid crystal layer 130. These controllable electrodes 112,122 may be controlled by a thin film transistor 123.

FIG. 1b depicts a cross-sectional view of three adjacent pixels of an LCD, wherein said cross-sectional view shows a cut beneath the liquid crystal layer 130 depicted in FIG. 1a, and wherein the first light transmissive area 110 and the first light reflective area 120 are associated with a first pixel, the second light transmissive area 110' and the second light reflective area 120' are associated with a second pixel, and third light transmissive area 110" and the third light reflective area 120" are associated with a third pixel, and wherein the light transmissive areas 110,110',110". Each of the thin film transistors 123,123',123" is configured to control the respective electrodes 112,122 112', 122' 112",122" of the associated light transmissive/reflective areas.

For instance, the first light transmissive area 110 may be associated with a green pixel by means of a green color filter (not depicted in FIG. 1b), the second light transmissive area 110' may be associated with a blue pixel by means of a blue color filter (not depicted in FIG. 1b), and the third light transmissive area 110" may be associated with a red pixel by means of a red color filter (not depicted in FIG. 1b). Furthermore, the light reflective areas 120,120',120" may represent black and white (B&W) reflective regions 120,120',120", i.e. no color filters are associated with these B&W reflective regions 120,120',120", and the B&W reflective areas 120, 120',120" reflectivity is controlled by means of the electrodes 122,122',122" so that the reflectivity correlates with an image content.

These B&W reflective areas 120,120',120" depicted in FIG. 1b are very good for standby mode visibility in case the display is driven in the second mode, i.e. when the backlight 150 is switched off.

Unfortunately, in case the display is driven in the first mode, i.e. it is illuminated with light emitted from the backlight 150 in order to pass the light transmissive regions 110, 110',110" associated with the different colors, then said B&W reflective areas 120,120',120" may cause a decreased image quality under bright environmental illumination, because the black and white light reflected from said B&W reflective areas 120,120',120" washes out the colors generated by the backlight and the light transmissive areas 110,110',110".

SUMMARY

A device is disclosed, comprising at least one light transmissive area configured to be coupled to a light source in order to be provided with backlight; at least one light reflective area, at least one light transmission control element associated with said at least one light reflective area, wherein said device is configured to be switched into a reflective blocking state when said at least one light transmissive area is provided with backlight, and wherein in said reflective blocking state said at least one light transmission control element is configured to cause light-blocking.

Furthermore, a method is disclosed, comprising determining whether a reflective blocking state of a device is to be entered, wherein said device comprises at least one light transmissive area configured to be coupled to a light source in order to be provided with backlight; at least one light reflective area, at least one light transmission control element associated with said at least one light reflective area, and wherein in said reflective blocking state said at least one light transmission control element causes light-blocking, and in case it is determined that said reflective blocking state is to be entered, switching said reflective blocking state switched active.

Furthermore, a computer-readable medium having a computer program stored thereon is disclosed. The computer program comprises instructions operable to cause a processor to determine whether a reflective blocking state of a device is to be entered, wherein said device comprises at least one light transmissive area configured to be coupled to a light source in order to be provided with backlight; at least one light reflective area, at least one light transmission control element associated with said at least one light reflective area, wherein in said reflective blocking state said at least one light transmission control element causes light-blocking, and in case it is determined that said reflective blocking state is to be entered, to switch said reflective blocking state active.

Furthermore, a computer program is disclosed. The computer program comprises instructions operable to cause a processor to determine whether a reflective blocking state of a device is to be entered, wherein said device comprises at least one light transmissive area configured to be coupled to a light source in order to be provided with backlight; at least one light reflective area, at least one light transmission control element associated with said at least one light reflective area, wherein in said reflective blocking state said at least one light transmission control element causes light-blocking, and in case it is determined that said reflective blocking state is to be entered, to switch said reflective blocking state active.

Furthermore, a system is disclosed. This system comprises at least one of said device, at least one light source, wherein said at least one light source is configured to provide backlight to at least one light transmissive area of said at least one device, and wherein said at least one light source is configured to be switched on or off; and a control unit connected with said at least one device, wherein said control unit is configured to determine whether a reflective blocking state of said at least one device is to be entered, and, in case it is determined that said reflective blocking state is to be entered, to switch said reflective blocking state active.

For instance, each of said at least one light transmissive area may be associated with a pixel element of a display, and each of said at least one light reflective area may be associated with a pixel element of a display. Further, for instance, the device may for instance be part of a display, for instance a liquid crystal display or any other suited display.

Said at least one light transmissive area is configured to let pass light through. For instance, a backlight from a switchable light source may be coupled into this at least one light transmissive area in order to illuminate this at least one light transmissive area when backlight is switched on.

The at least one light reflective area is configured to reflect light, e.g. ambient light from the environment. For instance, this at least one light reflective area may comprise a light reflective layer.

Furthermore, each of said at least one light reflective area may be associated with a black and white pixel, and each of said at least one light transmissive area may be associated with a color pixel, e.g. a green pixel, a red pixel or a blue pixel. For instance, respective color filters may deposited above or under said at least one light transmissive area, or a backlight with respective color may be used to provide colored pixels associated with said at least one light reflective area.

In case the device comprises a plurality of light transmissive areas, then adjacent light transmissive areas of this plurality of light transmissive areas may share a common light transmissive layer. Furthermore, in case the device comprises a plurality of light reflective areas, then adjacent light reflective areas of this plurality of light reflective areas may share a common light reflective layer.

The at least one light transmission control element associated with said at least one light reflective area may be deposited above said at least one light reflective area, or it may be integrated into said at least one light reflective area. The at least one light transmission control element is configured to control light transmission to the at least one light reflective area, and it can be switched into a state causing light-blocking.

For instance, said at least one light transmission control element may represent any kind of a light valve configured to block or let pass light, or said at least one light transmission control element may represent a kind of actuator configured to control at least one further light valve element of said device, wherein this at least one further light valve element is disposed above said at least one light reflective area.

For instance, in case said device is configured to be used as part of a liquid crystal display, then said at least one light transmission control element may be at least one light transmissive electrode configured to control a liquid crystal element, and each of said at least one light transmission control element may be associated with an electrical switching element in order to electrical switch the associated electrode. For instance, this electrical switching element may be a thin film transistor disposed close to the associated electrode. Furthermore, it will be clear for a person skilled in the art that the device may comprise at least one further light transmission control element in case said device is configured to be used as a part of a liquid crystal display. In this optional LCD-case, the at least one light transmission control element is placed on a first site of the liquid crystal element, e.g. below or above the liquid crystal element, and the at least on further light transmission control element is placed on the opposite site of the liquid crystal element. For instance, said light transmission control elements may represent ITO electrodes.

The device is configured to be switched into a reflective blocking state when said at least one light transmissive area is provided with backlight, e.g. from a switchable light source. In this reflective blocking state the at least one light transmission control element is switched into said state for causing light-blocking.

In this reflective blocking state it can be avoided that light reflected from said at least one reflective area interferes with light generated by the backlight and transmitted through the at least one light transmissive area, since said at least one light reflective area does not receive light due to the blocking state of said at least one light transmission control element.

For instance, in case said at least one light transmissive area is associated with at least one color pixel and said at least one light reflective area is associated with at least one black and white (B&W) pixel, then this reflective blocking state is capable to avoid that colors generated by light transmitted through the at least one light transmissive area is washed out by reflected light from said at least one light reflective area. Accordingly, the color image quality can be increased, in particular in case of intensive light in the environment.

Furthermore, for instance, each of said at least one light transmission control element may be associated with exactly one out of said at least one light reflective area. Then, when the device is not in the reflective blocking state, said at least one light transmission control element may be further used to control the brightness of the associated at least one B&W pixel, respectively, e.g. according to a control signal in order to correlate said at least one B&W pixel with image information.

Furthermore, the device may comprise at least one further light transmission control element associated with said at least one light transmissive area in order to control the brightness of the associated at least one color pixel, e.g. according to a control signal in order to correlate said at least one color pixel with image information.

According to an exemplary embodiment of the present invention, said at least one light reflective area are at least two light reflective areas, and at least two of said at least two light reflective areas are associated with one common light transmission control element of said at least one light transmission control element.

For instance, said device comprises a plurality of light reflective areas, e.g. associated with a plurality of B&W pixels of a display. Then this common light transmission control element can be used to switch the device into the reflective blocking state.

E.g., said plurality of light reflective areas maybe arranged in form of at least one column of a display and one common light transmission control element is deposited above each of said at least one column of light reflective areas. Then, each column of light reflective areas is controllable to block light by means of the associated common light transmissive control element. Accordingly, an efficient arrangement of a display configured to be switched in to said reflective blocking state can be achieved.

For example, the common light transmission control element may be connected to a single signal line, and via this signal line the common light transmission control element can be controlled to switch the device into the reflective blocking state by means of a single control signal.

Furthermore, the at least two light reflective areas associated with said at least one common light transmission control element may be associated with at least two further light transmission control elements configured to control the brightness at least two pixels associated with said at least two light reflective areas. These at least two further light transmission control elements may be used to control the associated pixels according to a control signal in order to correlate said at least one B&W pixel with image information when the device is not in the reflective blocking state.

According to an exemplary embodiment of the present invention, each of at least one of said at least two of said at least two light reflective areas is deposited adjacent to one of said at least one light transmissive area, wherein said adjacent light reflective area and light transmissive area are associated with one common pixel having a common pixel light transmission control element.

This common pixel control element and the associated light reflective area and light transmissive area may be associated with one pixel configured to be used in a display. For instance, the light transmissive area may be associated with a color section of this pixel, e.g. with a red, a green or a blue section, as mentioned above, and the light reflective are may be associated with a B&W section of this pixel, as mentioned above. For instance, this pixel associated with said light reflective and light transmissive area may represent a sub-pixel of a color display.

The common light transmission pixel control element allows controlling the light transmission of reflected light from the associated light reflective area and from transmitted light form the associated light transmissive area. The explanations and advantages mentioned above with respect to the at least one light transmission control element also hold for a realization of this common pixel light transmission control element. Thus, for instance, this common pixel light transmission control element may represent a light valve or an actuator configured to control at least one further light valve element of said device.

For example, a plurality of these common pixel control elements and the associated light reflective areas and light transmissive areas defining a plurality of sub-pixels may be arranged in a manner for forming a pixel matrix or any pixel arrangement of a display.

For instance, a first light transmissive area and a first light reflective area may have one common pixel light transmission control element, wherein the first light transmissive area maybe associated with a red colored section of a first sub-pixel and the first light reflective area may be associated with a B&W section of this first sub-pixel. In a similar way, a second light transmissive area and a second light reflective area may be associated with a sub-pixel comprising a green-colored and a B&W section and, and a third light transmissive area and a third light reflective area may be associated with a sub-pixel comprising a blue-colored and a B&W section. These three sub-pixels may form a RGB/B&W pixel, and a plurality of these RGB/B&W pixels may be disposed in a display.

One of said common light transmission control elements may be disposed above said first, second and third light reflective areas in order to cause light-blocking with respect to said light reflective areas when the device is switched in the reflective blocking state.

According to an exemplary embodiment of the present invention, said device comprises a liquid crystal element, and each of said at least one common pixel light transmission control element is a pixel electrode configured to control an associated region of said liquid crystal element, and said common light transmission control element is a light transmissive electrode.

Thus, said at least one common pixel light transmission control element and the at least one common light transmission control element may represent light transmissive electrodes configured to control associated regions of the liquid crystal element. Said liquid crystal element may be configured to be used in a LCD display.

For instance, said at least one common pixel light transmission control element may be deposited beneath said liquid crystal element and said at least one common light transmission control element may be deposited above said liquid crystal and above the associated light reflective areas. Furthermore, for instance, this arrangement may also be reversed, i.e. with common pixel light transmission control elements deposited above the liquid crystal element and with said at least one common light transmission control element deposited beneath the liquid crystal element.

A further light transmissive electrode may be disposed above the liquid crystal element and above regions of the light transmissive areas, so that this further light transmissive electrode may act as a counterpart to the common pixel light transmission control elements in the regions of the light transmissive areas.

Furthermore, each of said common pixel light transmission control electrode may be associated with an electrical switching element in order to electrical switch the associated electrode. For instance, this electrical switching element maybe a thin film transistor disposed close to the associated electrode.

For instance, said light transmissive electrodes may be transparent indium tin oxide (ITO) electrodes.

Furthermore, for instance, in this reflective blocking state the at least one common light transmission control element electrode may for instance be provided with a voltage that controls the regions of the liquid crystal element disposed over the light reflective areas to block light independently from control signals provided to the common pixel light transmission control elements.

Thus, the reflective blocking state can be activated and deactivated by means of a voltage supplied to a signal line connected to the at least one common light transmission control element. Accordingly, the reflective blocking state can be controlled in an easy way by means of the at least one common light transmission control element.

According to an exemplary embodiment of the present invention, said at least one light transmissive area are at least two light transmissive areas, and said at least two light reflective areas and said at least two light transmissive areas are arranged in form of a matrix in order to form a plurality of pixels, and said common light transmission control element is rake-shaped and deposited above said at least two of said at least two light reflective areas.

For instance, said at least two light reflective transmissive areas may represent a plurality of light reflective areas arranged in at least one column, and said at least two light reflective areas may represent a plurality of light reflective areas arranged in at least one column, wherein said light reflective and light transmissive columns may be disposed in an alternating form, e.g. in order to form columns of said RGB/B&W pixels mentioned above.

The rake-shaped common light transmission control element may be deposited above the liquid crystal cell element and is configured to block light transmission of regions of the liquid crystal associated with the at least one column of light reflective areas when the device is switched into the reflective blocking state. When the device is not in the reflective blocking state, then the rake-shaped common light transmission control element may act as counterpart electrode with respect to the common pixel light transmission control elements in order to control the light transmittance of regions of the liquid crystal cell element associated with the light reflective areas, e.g. due to control signals controlling the plurality of common pixel light transmission control elements.

This rake-shaped arrangement of the common light transmission control element allows an efficient design of a display since only one light transmission control element has be controlled in order to switch the device into the reflective blocking state.

For instance, said rake-shaped common light transmission control element may be a light transmissive ITO electrode.

According to an exemplary embodiment of the present invention, said device comprises a further rake-shaped light transmission control element deposited above at least two of said at least two light transmissive areas, wherein the common light transmission control element and the further rake-shaped light transmission control element fit into each other.

The further rake-shaped common light transmission control element may act as counterpart electrode with respect to the common pixel light transmission control elements in order to control the light transmittance of regions of the liquid crystal cell element associated with the light transmissive areas, e.g. due to control signals controlling the plurality of common pixel light transmission control elements.

According to an exemplary embodiment of the present invention, at least one of said at least one light transmission control element represents a sub-pixel light transmission control element associated with exactly one of said at least one light reflective area.

Each of said at least one sub-pixel light transmission control element can be used either to control the light transmission to the at least one light reflective area according to a sub-pixel control signal, or each of said at least one sub-pixel light transmission control element can be switched into a state causing light-blocking when the device is switched into the reflective blocking state.

Thus, when said reflective blocking state is inactive, then the sub-pixels associated with at least one of said at least one light reflective area separate can be controlled individually by means of the respective sub-pixel light transmission control elements.

For instance, in case that the device is configured to represent a part of a LCD display, each of at least one sub-pixel light transmission control element may represent a light transmissive electrode configured to control an associated region of a liquid crystal element. Furthermore, each of said light transmissive electrodes may be associated with an electrical switching element in order to electrical switch the associated electrode. For instance, this electrical switching element may be a thin film transistor disposed close to the associated electrode.

According to an exemplary embodiment of the present invention, the device comprises at least one further sub-pixel light transmission control element, and each of said at least one further sub-pixel light transmission control element is associated with exactly one of said at least one light transmissive area.

Thus, the sub-pixels associated with said at least one further sub-pixel light transmission control element can be controlled individually by means of the respective sub-pixel light transmission control element.

For instance, in case that the device is configured to represent a part of a LCD display, each of said at least one further sub-pixel light transmission control element may represent a light transmissive electrode configured to control an associated region of a liquid crystal element. Furthermore, each of said light transmissive electrodes may be associated with an electrical switching element in order to electrical switch the associated electrode. For instance, this electrical switching element may be a thin film transistor disposed close to the associated electrode.

According to an exemplary embodiment of the present invention, the device comprises a common control signal line connected to each of at least one sub-pixel light transmission control element in order to control said at least one sub-pixel light transmission control element causing light-blocking when the device is switched into said reflective blocking state.

In this reflective blocking state the single control line overwrites other sub-pixel information at the respective at least one sub-pixel control element and forces this at least one sub-pixel control element to block light. For instance, each of said at least one sub-pixel control element may comprise a separate switching element which is configured to set the respective sub-pixel light transmission control element in the reflective blocking state in response to a control signal on the single control line. Said separate switching element is configured to overwrite any other control signal associated with the respective sub-pixel light transmission control element when said device is switched into said reflective blocking state. Thus, a reliable switching operation into the reflective blocking state can be achieved.

For instance, in case that the device is configured to represent a part of a LCD display, said at least one separate switching element may represent a separate thin film transistor associated with the respective sub-pixel light transmission control element, which may represent a light transmissive electrode.

Thus, the device can be set into the reflective blocking state in an easy way by means of the single control line.

According to an exemplary embodiment of the present invention, said device comprises a liquid crystal element disposed above said at least one light transmissive area and said at least one light reflective area, and said control elements represent light transmissive electrodes configured to control regions of said liquid crystal element.

For instance, said device may represent a liquid crystal display.

According to an exemplary embodiment of the present invention, a first of said at least one light transmissive area is associated with a red sub-pixel, and wherein a second of said at least one light transmissive area is associated with a green sub-pixel, and wherein a third of said at least one light transmissive area is associated with a blue sub-pixel.

For instance, said first, second and third light transmissive areas may be arranged adjacent to each other in order to from a group. E.g. these light transmissive areas may be arranged in form of a column. Furthermore, for instance, each of said three light transmissive areas may be associated with a separate light reflective area of said at least one light reflective area, or, alternatively, said group of light transmissive area may be associated with a common light reflective area of said at least one light reflective area.

Thus, said group of light transmissive areas and said one ore three associated light reflective areas may form a red/ green/blue black/white-pixel, wherein in said reflective blocking state the black/white-subpixel does not reflect light due to the light blocking caused by said at least one light transmission control element associated with said at least one light reflective area. Thus, washing out the colors when backlight is provided to the group of light transmissive areas is avoided since not black/white reflected light interferes from the associated one or three light reflective areas.

A plurality of these red/green/blue black/white-pixels may be arranged in order to form a display, e.g. a LCD display.

These and other aspects of the invention will be apparent from and elucidated with reference to the detailed description presented hereinafter. The features of the present invention and of its exemplary embodiments as presented above are understood to be disclosed also in all possible combinations with each other.

BRIEF DESCRIPTION OF THE FIGURES

In the figures show:

FIG. 3a: a schematic cross-sectional top-view of a second exemplary embodiment of the present invention;

FIG. 3b: a schematic cross-sectional side-view of the second exemplary embodiment of the present invention;

DETAILED DESCRIPTION OF THE INVENTION

In the following detailed description of the present invention, exemplary embodiments of the present invention will be described.

Figure 2A:
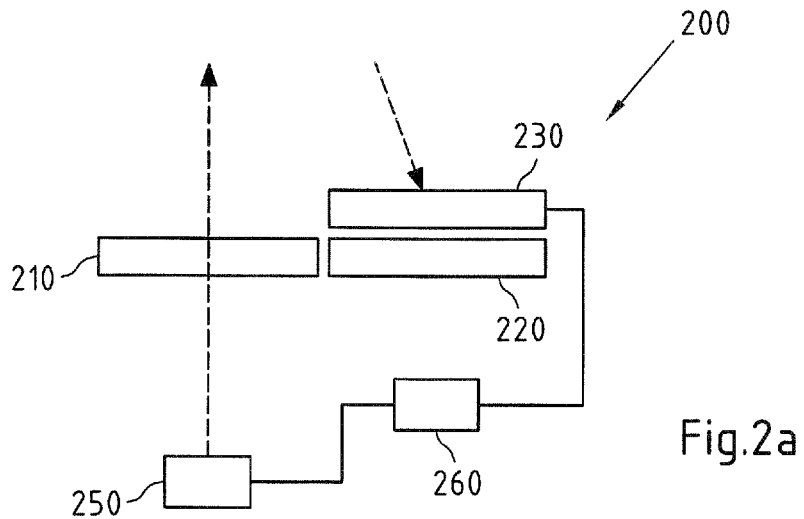
FIG. 2a: a schematic cross-sectional side-view of a first exemplary embodiment of the present invention illustrating the reflective blocking state.
Figure 2B:
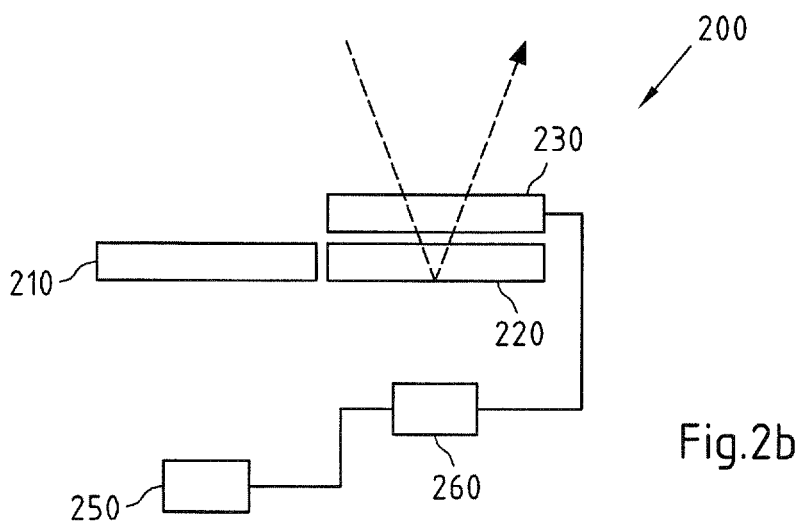
FIG. 2b: a schematic cross-sectional side-view of the first exemplary embodiment of the present invention without reflective blocking state.
Figure 2C:
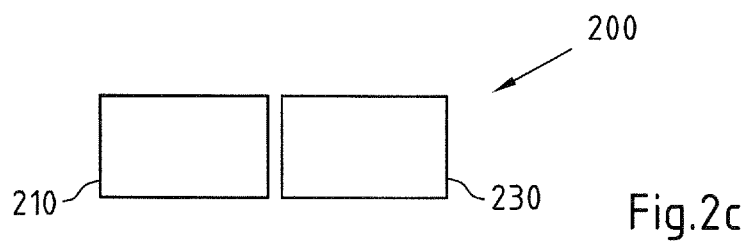
FIG. 2c: a schematic top-view of the first exemplary embodiment of the present invention.

FIGS. 2a to 2c depict schematic diagrams in different views of a first exemplary embodiment of a device 200 according to the present invention, wherein FIGS. 2a and 2b depict a side views of the device 200 indifferent states and FIG. 2c depicts a top view of the device 200 depicted in FIG. 2a.

This device 200 may be part of a display, for instance a liquid crystal display or any other suited display.

Figure 1A:
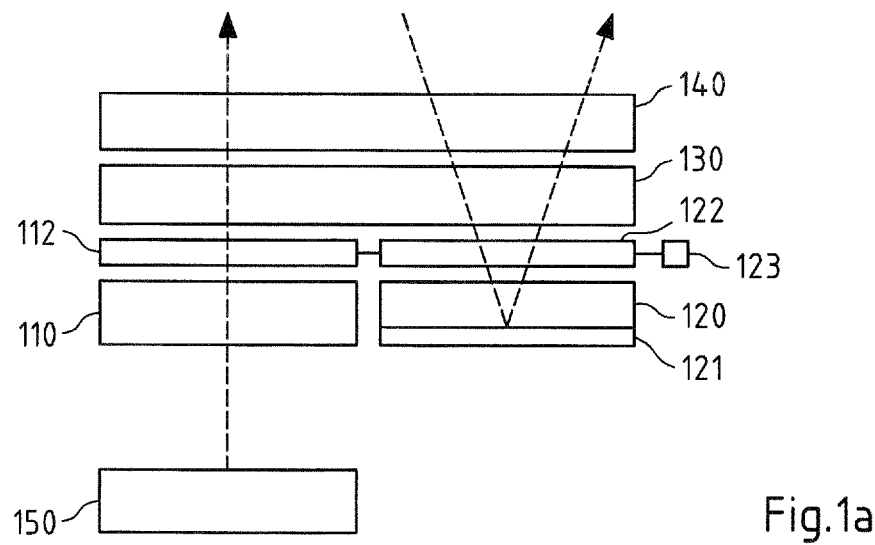
FIG. 1a: A schematic cross-sectional side-view of a primary part of a liquid crystal display.
Figure 1B:
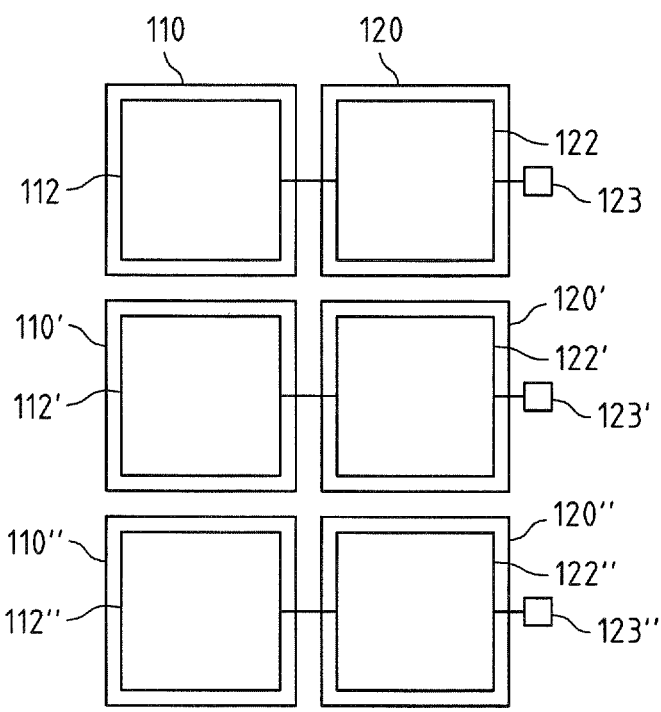
FIG. 1b: a schematic cross-sectional top-view of a primary part of a liquid crystal display.

The device 200 comprises at least one light transmissive area 210 and at least one light reflective area 220, wherein the at least one light transmissive area 210 is configured to let pass light through, as indicated in FIG. 2a. For instance, a backlight from a switchable light source 250 may be coupled into this at least one light transmissive area 210, e.g. similar as described in context of the FIGS. 1a and 1b regarding the light transmissive ares 110,110',110". In case the device 200 comprises a plurality of light transmissive areas 210, then adjacent light transmissive areas of this plurality of light transmissive areas 210 may share a common light transmissive layer. Furthermore, in case the device 200 comprises a plurality of light reflective areas 220, then adjacent light reflective areas of this plurality of light reflective areas 220 may share a common light reflective layer.

The at least one light reflective area 220 is configured to reflect light, e.g. ambient light from the environment. For instance, this at least light reflective area 220 may comprise a light reflective layer (not depicted). For instance, this at least one light reflective area 220 may correspond to the light reflection areas 120,120',120" depicted in FIGS. 1a and 1b, but they also may represent other reflective regions.

For instance, each of said at least one light transmissive area 210 and each of said at least one light reflective area 220 may be associated with a pixel of a display. Furthermore, each of said at least one light reflective area 220 may be associated with a black and white pixel, and each of said at least one light transmissive area 210 may be associated with a color pixel, e.g. a green pixel, a red pixel or a blue pixel.

For instance, respective color filters may be deposited above or under said at least one light transmissive area 210.

The device 200 further comprises at least one light transmission control element 230 associated with said at least one light reflective area 220. This at least one light transmission control element 230 may be deposited above said at least one light reflective area 220, as depicted in FIGS. 2a and 2b, or it may be integrated into said at least one light reflective area 220. The at least one light transmission control element 230 is configured to control light transmission to the at least one light reflective area 220, and it can be switched into a state causing light-blocking.

For instance, said at least one light transmission control element 230 may represent any kind of a light valve configured to block or let pass light, or said at least one light transmission control element 230 may represent a kind of actuator for controlling a further light valve element (not depicted in FIGS. 2a and 2b) disposed above said at least one light reflective area 230.

For instance, in case said device 200 is part of a liquid crystal display, then said at least one light transmission control element 230 may be at least one light transmissive electrode configured to control a liquid crystal element, and each of said at least one light transmission control element 230 may be associated with an electrical switching element in order to electrical switch the associated electrode. For instance, this electrical switching element may be a thin film transistor disposed close to the associated electrode.

The device 200 is configured to be switched into a reflective blocking state when said at least one light transmissive area 210 is provided with backlight, e.g. from the switchable light source 250. In this reflective blocking state the at least one light transmission control element 230 is switched into said state for causing light-blocking, as exemplarily depicted in FIG. 2a.

In this reflective blocking state it can be avoided that light reflected from said at least one reflective area 220 interferes with light generated by the backlight and transmitted through the at least one light transmissive area 210, since said at least one light reflective area 220 does not receive light due to the blocking state of said at least one light transmission control element 230.

For instance, in case said at least one light transmissive area 210 is associated with at least one color pixel, then this reflective blocking state is capable to avoid that colors generated by light transmitted through the at least one light transmissive area 210 is washed out by reflected light from said at least one light reflective area 220.

Figure 6:
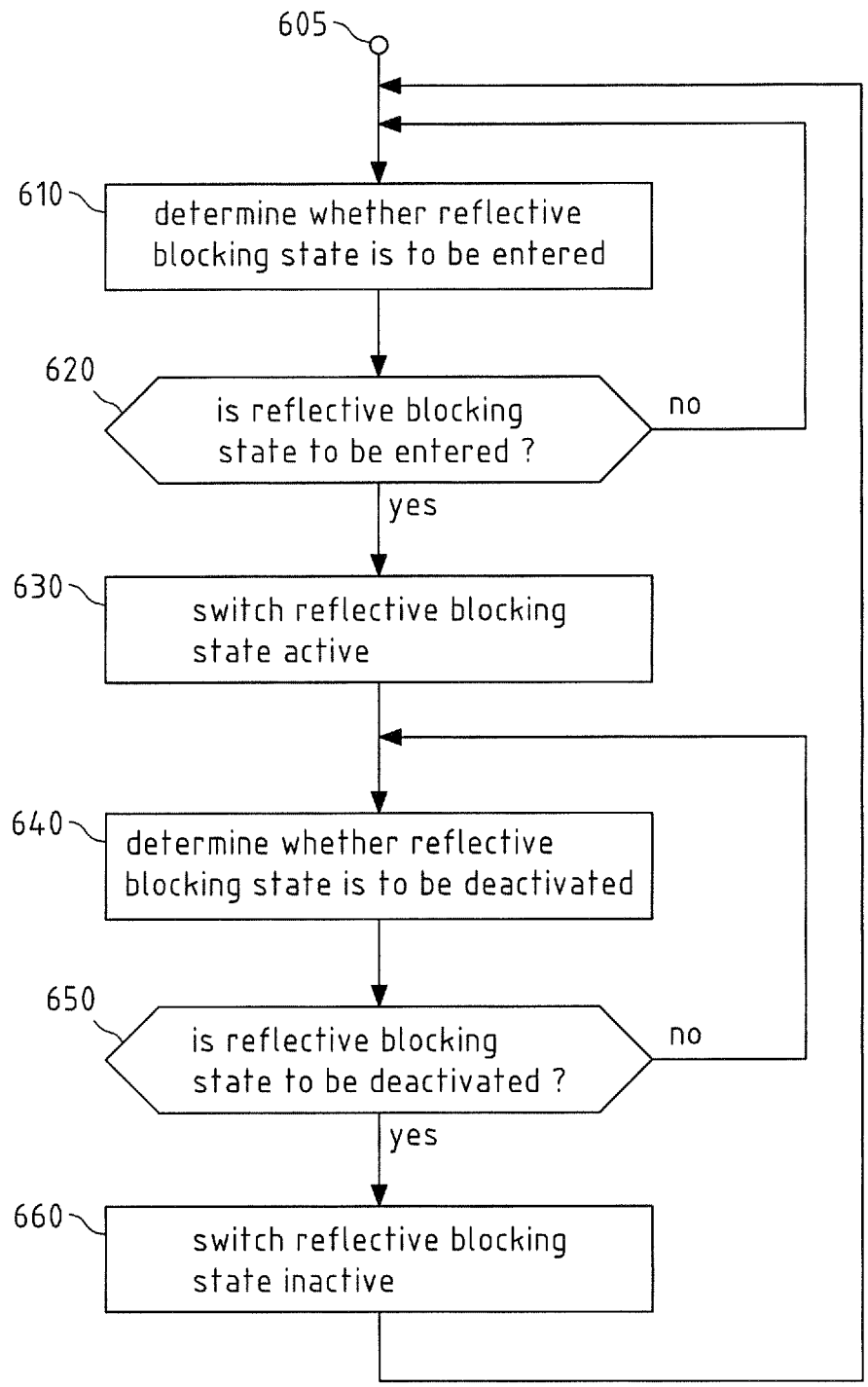
FIG. 6: a schematic flow-chart according to an exemplary embodiment of a method according to the present invention.

FIG. 6 depicts an exemplary method of the present invention in order to control a device according to the present invention, which is configured to be provided with backlight in order to illuminate the at least one light transmissive area, e.g. the at least one light transmissive area 210 of device 200 depicted in FIGS. 2a, 2b and 2c. For instance, this method may be performed by a separate control unit 260 which is configured to control said at least one light transmission control element 230.

At first, for instance, it is assumed that the backlight is switched off (step 605). Then it is determined whether the reflective blocking state is to be entered (610). For instance, it may be determined whether a light source 250 providing backlight to the at least one light transmissive area 210 is switched on, and in case it is determined that the reflective blocking state is to be entered (step 610), e.g. in case it is determined that the backlight is switched on, then the reflective blocking state is entered (step 630). For instance, with respect to the device 200 depicted in FIGS. 2a, 2b and 2c, due to this reflective blocking state the at least one light transmission control element 230 is switched into a state for blocking light. This reflective blocking state is exemplarily depicted in FIG. 2a.

Then it is determined whether the reflective blocking state is to be deactivated (step 640), e.g. by determining whether the backlight is switched off. In case it is determined that the reflective blocking is to be deactivated (step 650), then the reflective blocking state is switched inactive (step 660), otherwise the method may jump back in the flow in order to once again determining whether the reflective blocking state is to be deactivated (step 640). For instance, with respect to the device 200 depicted in FIGS. 2a, 2b and 2c, the reflective blocking state may be deactivated by switching the at least one light transmission control element 230 into a state that allows to let pass light through this at least one light transmission control element 230.

Furthermore, for instance, in this inactive state each of said at least one light transmission control element 230 may be controllable by a signal in order to display a respective pixel of an image. For instance, the device 200 may comprise at least one further light transmission control element (not depicted in FIGS. 2a, 2b and 2c) associated with said at least one light transmissive region 210, wherein each of said at least one further light transmission control element may be controllable in order to display a respective pixel of an image in said reflective blocking state.

For instance, the device 200 may be used in any mobile phone, handheld-device or any apparatus comprising a display configured to be driven in a first mode with activated backlight and in a second mode using ambient light from the environment, wherein for instance a plurality of the devices 200 may be arranged in said display. Thus, such a display comprising the device 200 according to the invention can be switched into the aforementioned reflective blocking state in order to avoid that light reflected from the at least one light reflective area 220 washes out the colors generated by the backlight and the at least one light transmissive area 210 of the display. This may enable an increased image quality when the display is driven in the backlight mode. Accordingly, the color image quality can be increased, in particular in case of intensive light in the environment.

In the sequel, further exemplary embodiments of devices according to the present invention are presented, wherein these embodiments are basically based on the exemplary embodiment depicted in FIGS. 2a, 2b and 2c. Thus, the aforementioned explanations and advantages with respect to the device 200 depicted in FIGS. 2a, 2b and 2c and the method depicted in FIG. 6 also hold for the succeeding exemplary embodiments, in particular the explanations and advantages concerning the at least one light reflective area 220, the at least one light transmissive area 210 and the at least one light transmission control element 230.

FIGS. 3a and 3b depict a second exemplary embodiment of a device 300 according to the present invention. FIG. 3b depicts a side-view of the device 300 and FIG. 3a depicts a cross-sectional view of the device 300 along line 305 in FIG. 3a.

This device 300 comprises a first light transmissive area 310, a second light transmissive area 313 and a third light transmissive area 316 configured to be coupled to a light source 350 in order to be provided with backlight. For instance, the first light transmissive area 310 may be associated with a green sub-pixel, e.g. by means of green color filter or by means of a green backlight, the second light transmissive area 313 maybe associated with a blue sub-pixel, e.g. by means of blue color filter or by means of blue backlight, and the third light transmissive area 316 may be associated with a red pixel, e.g. by means of red color filter or by means of red backlight.

Each of said light transmissive areas 310,313,316 is associated with a separate sub-pixel control element 311,314,317, and each of said sub-pixel control element 311,314,317 is individually controllable, e.g. by means of control unit 360, as depicted in FIG. 3b. For instance, in case that device 300 is part of a LCD display, said sub-pixel control elements 311, 314,317 may represent light transmissive electrodes 311,314, 317 configured to control associated regions of a liquid crystal element 370, as exemplarily depicted in FIG. 3b. Furthermore, each of said light transmissive electrodes 311, 314,317 may be associated with an electrical switching element in order to electrical switch the associated electrode. For instance, this electrical switching element may be a thin film transistor disposed close to the associated electrode.

The device 300 further comprises a light reflective area 320 representing a black and white (B&W) reflective area. This light reflective area 320 is associated with a light transmission control element 330 which is disposed above the light reflective area 320 and configured to block light in case the device is switched into the reflective blocking state as aforementioned with respect to device 200 depicted in FIGS. 2a, 2b and 2c. This light transmission control element 320 is further individually controllable in case the reflective blocking state is not entered.

Thus, for instance, when the light transmissive areas 310, 313,316 are not provided with backlight, then the light transmission control element 330 associated with the light reflective area 320 can be used as a sub-pixel control element 330 in order to correlate the light transmittance according to a control signal. For instance, in case that device 300 is part of a LCD display, said light transmission control element 320 may represent a light transmissive electrode 320 configured to control an associated region of a liquid crystal element 370, as exemplarily depicted in FIG. 3b. In this optional LCD-case at least one further ITO electrode is placed above the liquid crystal element 370 (not depicted in FIG. 3b). Furthermore, said light transmissive electrode 320 may be associated with an electrical switching element in order to electrical switch the associated electrode. For instance, this electrical switching element may be a thin film transistor disposed close to the associated electrode.

Thus, the device 300 may represent a pixel in Red-Green-Blue-White (RGBW) layout consisting of four subpixels. The device 300 can be driven in a first mode with activated backlight in order to illuminate the light transmissive areas 310, 313,316 and to provide colored sub-pixels individually controllable by means of the sub-pixel control elements 311,314, 317, respectively. In this first mode the device is switched in the reflective blocking state in order to avoid that light reflected from the light reflective area 320 interferes with the color light from the sub-pixels 310,313,316 and washes out the colors.

In a second mode, when backlight is switched off, then the light transmission control element 320 can be used to control the B&W sub-pixel associated with the light reflective area 320.

For instance, a display may comprise a plurality of devices 300, e.g. arranged in form of matrix or in another arrangement well-suited for a pixel-display, wherein each of the plurality of devices 300 represents a RGBW-pixel consisting of three color sub-pixels and one black/white sub-pixel. Thus, this display can be driven in the first mode in order to provide color images controlled by the sub-pixel control elements 311,314,317 of the devices 300 with simultaneously light-blocked light reflective areas 320 of the devices 300. In the second mode, said display can provide B&W images controlled by the light transmissive elements 320 associated with the light reflective areas 320 of the device 300.

Figure 4A:
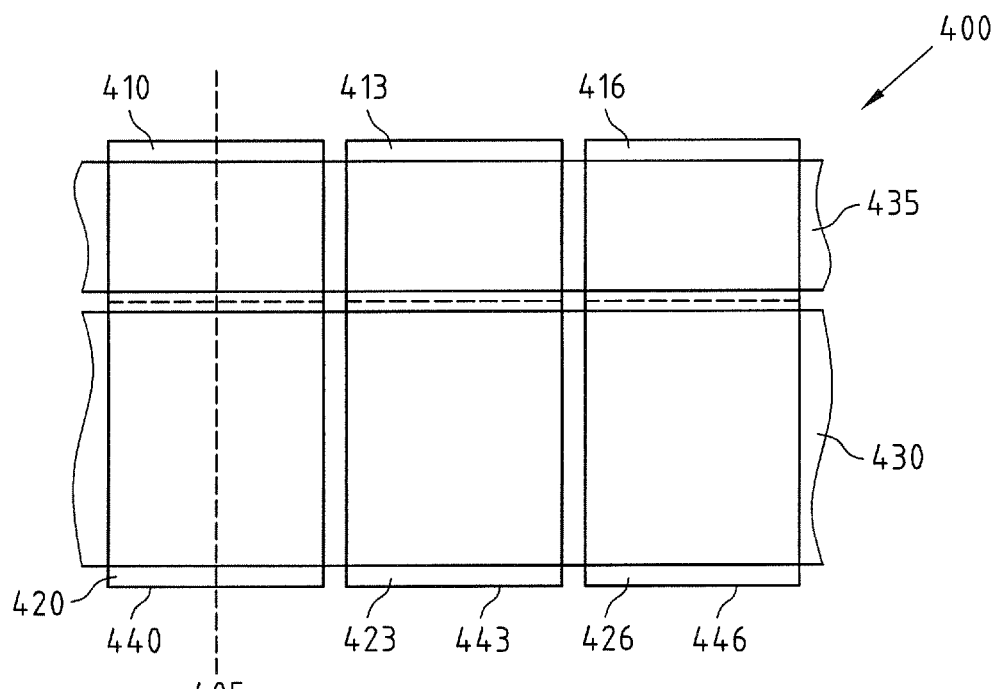
FIG. 4a: a schematic cross-sectional top-view of a third exemplary embodiment of the present invention.
Figure 4B:
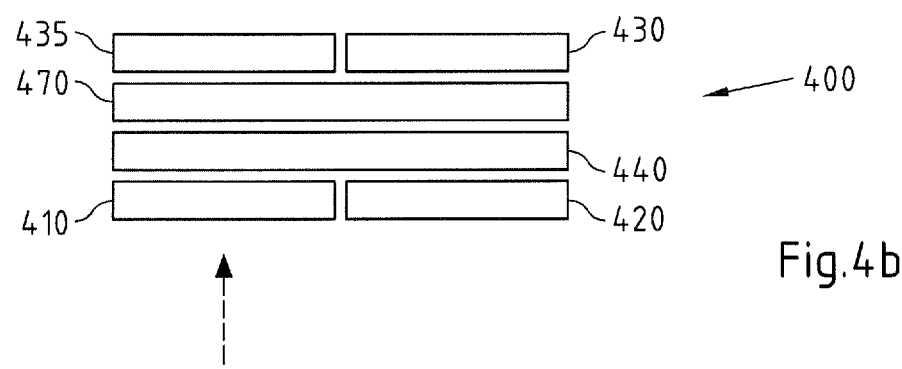
FIG. 4b: a schematic cross-sectional side-view of the third exemplary embodiment of the present invention.

FIGS. 4a and 4b depict a third exemplary embodiment of a device 400 according to the present invention. FIG. 4a depicts a top view of the device 400 and FIG. 4b depicts a cross-sectional view of an exemplary embodiment of the device 400 along line 405 in FIG. 4a.

The device 400 comprises a first light reflective area 420, a second light reflective area 423 and a third light reflective area 426, and it comprises a first light transmissive area 410, a second light transmissive area 413 and a third light transmissive area 416, as depicted in FIG. 4a. These light transmissive areas 410,413,416 are configured to be coupled to a switchable backlight as aforementioned.

For instance, the first, second and third light reflective areas 420,423,426 may share a common light reflective layer, but they also may be associated with an own light reflective layer, respectively. Further, for instance, the first, second and third light transmissive areas 410,413,416 may share a common light transmissive layer, but they also may be associated with an own light transmissive layer, respectively.

The first light reflective area 420 and the first light transmissive area 410 are disposed adjacent to each other and are associated with one common pixel control element 440 disposed above the areas 420,410, as can be seen in the cross-sectional view depicted in FIG. 4a and in FIG. 4b. Thus, the first light reflective area 420 and the first light transmissive area 410 are associated with a first common sub-pixel controllable by means of the common pixel control element 440.

In a similar way, the second light reflective area 423 and the second light transmissive area 413 are associated with a second common sub-pixel controllable by means of a common pixel control element 443, and the third light reflective area 426 and the third light transmissive area 416 are associated with a third common sub-pixel controllable by means of a common pixel control element 446.

Furthermore, for instance, color filters (not depicted in FIGS. 4a and 4b) may be disposed above or beneath the light transmissive areas 410,413,416, so that each sub-pixel is divided into a color sub-part associated with the respective light transmissive area 410,413,416 and into a B&W sub-part associated with the respective light reflective area 420,423, 426. Alternatively, for instance, the color filters may be replaced by respective colored backlights provided to the light transmissive areas 410,413,416.

For instance, the first transmissive area 410 may be associated with a red colored sub-part of the first sub-pixel, the second transmissive area 413 may be associated with a green colored sub-part of the second sub-pixel, and the third transmissive area 416 may be associated with a blue colored sub-part of the third sub-pixel.

Furthermore, the device 400 comprises one common light transmission control element 430 associated with said first, second and third light reflective areas 420,423,426. This common light transmission control element 430 is disposed above said first, second and third light reflective areas 420,423,426, as depicted in FIGS. 4a and 4b, and allows causing light blocking with respect to said light reflective areas 420,423, 426. Thus, by controlling this common light transmission control element 430 the device 400 can be switched in said reflective blocking state.

Thus, the device 400 may represent an element containing three sub-pixels, wherein in the reflective blocking state this element comprises three controllable color sub-pixels associated with the light transmissive areas 410,413,416, and in deactivated reflecting blocking state the element comprises three controllable B&W sub-pixels associated with the light reflective areas 420,423,426.

The explanations and advantages mentioned above with respect to the light transmission element 220 in the first exemplary embodiment also holds for the common light transmission control element 430 of this third exemplary embodiment.

Without any restrictions and only for illustration, it is exemplarily assumed in the sequel that the device 400 represents a part of a LCD display.

For this assumption the common pixel control elements 440,443,446 and the common light transmission control element 430 represent light transmissive electrodes configured to control associated regions of a liquid crystal element 470, as exemplarily depicted in FIG. 4a. A further light transmissive electrode 435 may be disposed above the liquid crystal element 470 associated with regions of the light transmissive areas 410,413,416, so that this further light transmissive electrode 435 acts as a counterpart to the common pixel control elements 440,443,446 in the regions of the light transmissive areas 410,413,416. For instance, said light transmissive electrodes may be transparent indium tin oxide (ITO) electrodes. In FIG. 4a the common pixel control elements 440,443,446 are deposited beneath the liquid crystal element 470 and the light transmission control elements 430,435 are deposited above the liquid crystal element 470, but this arrangement may also be reversed, i.e. with common pixel control elements 440,443,446 deposited above and light transmission control elements 430,435 deposited below the liquid crystal element 470.

For example, the common light transmission control element 430 may be connected to a single signal line, and via this signal line the common light transmission control element 430 can be controlled to switch the device 400 into the reflective blocking state by means of a single control signal. For instance, in this reflective blocking state the common ITO electrode 430 may for instance be provided with a voltage that controls the regions of the liquid crystal element 470 disposed over the light reflective areas 420,423,426 to block light independently from control signals provided to the common pixel control elements 440,443,446.

Thus, for instance, the reflective blocking state can be activated and deactivated by means of a voltage supplied to the signal line connected to the common light transmission control element 430. Accordingly, the reflective blocking state can be controlled in an easy way by means of the common light transmission control element 430.

Figure 4C:
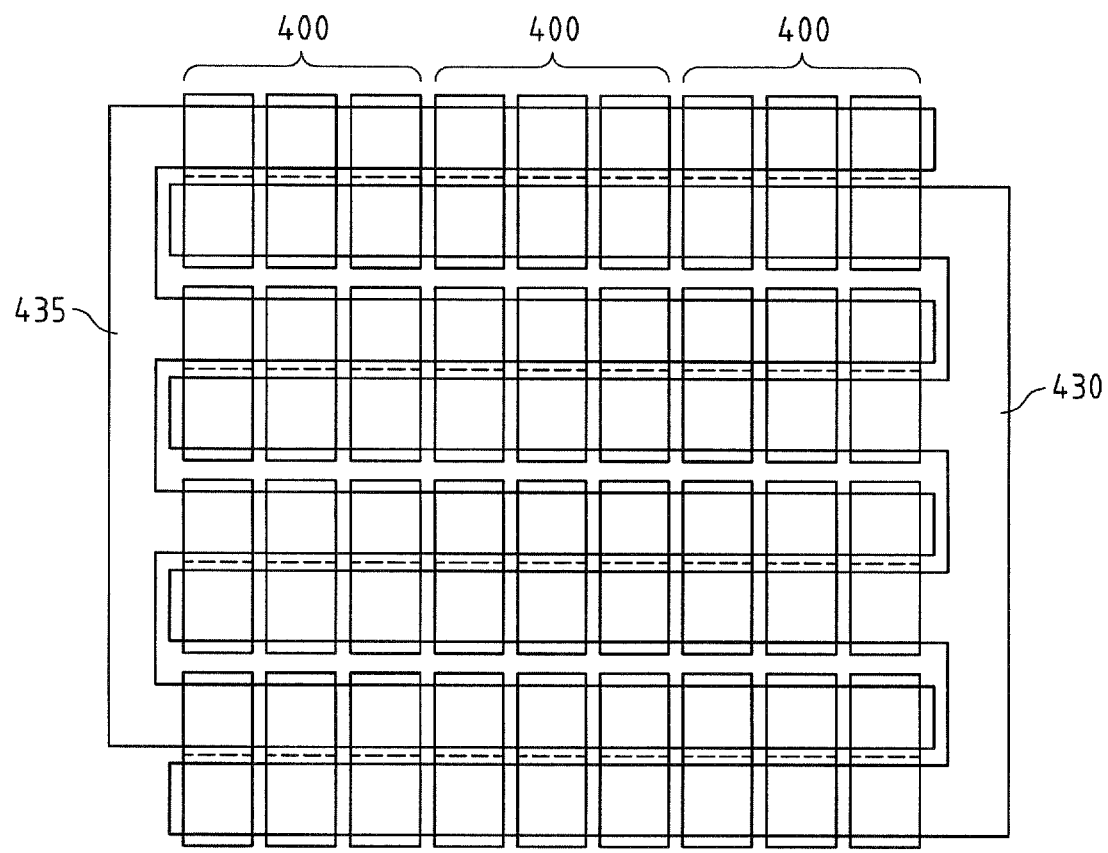
FIG. 4c: a schematic cross-sectional top-view of a fourth exemplary embodiment of the present invention.

FIG. 4c depicts a fourth exemplary embodiment of a device 480 according to the present invention, wherein this device 480 comprises a plurality of devices 400 of the third embodiment arranged in form a matrix. Thus, the aforementioned explanations and advantages with respect to the device 400 also hold for this fourth exemplary embodiment.

For instance, adjacent light reflective areas of the plurality of light reflective areas 420,423,426 of the device 400 may share a common light reflective layer, and adjacent light transmissive areas of the plurality of light transmissive areas 410,413,416 may share a common light transmissive layer—

The common light transmission control element 430 of the devices 400 is formed as a single rake-shaped common light transmission control element 430 deposited above the plurality of all light reflective areas 420,423,426 of said devices 400, as depicted in FIG. 4c. Thus, by means of this single rake-shaped light control element 430 the device 480 can be switched into the reflective blocking state, since each of the devices 400 can be controlled by this single rake-shaped light control element 430 as explained with respect to the third exemplary embodiment.

Furthermore, without any restrictions and only for illustration, it is exemplarily assumed in the sequel that the device 480 represents an LCD display and the devices 400 represent LCD display parts as aforementioned. For this assumption the rake-shaped light transmission control element 430 represents a light transmissive electrode, e.g. an ITO electrode. Furthermore, for this assumption the optional further light transmissive electrode 435 of the devices 400 may be formed as a further single rake-shaped common light transmissive electrode 435 deposited above the plurality of all light reflective 410,413,426, wherein this further single rake-shaped common light transmissive electrode 435 and the rake-shaped light transmission control element fit into each other with being connected to each other.

This rake-shaped arrangement of the light transmissive electrodes 430 and 435 allows an efficient design of a display 498 configured to be switched into said reflective blocking state.

Figure 5A:
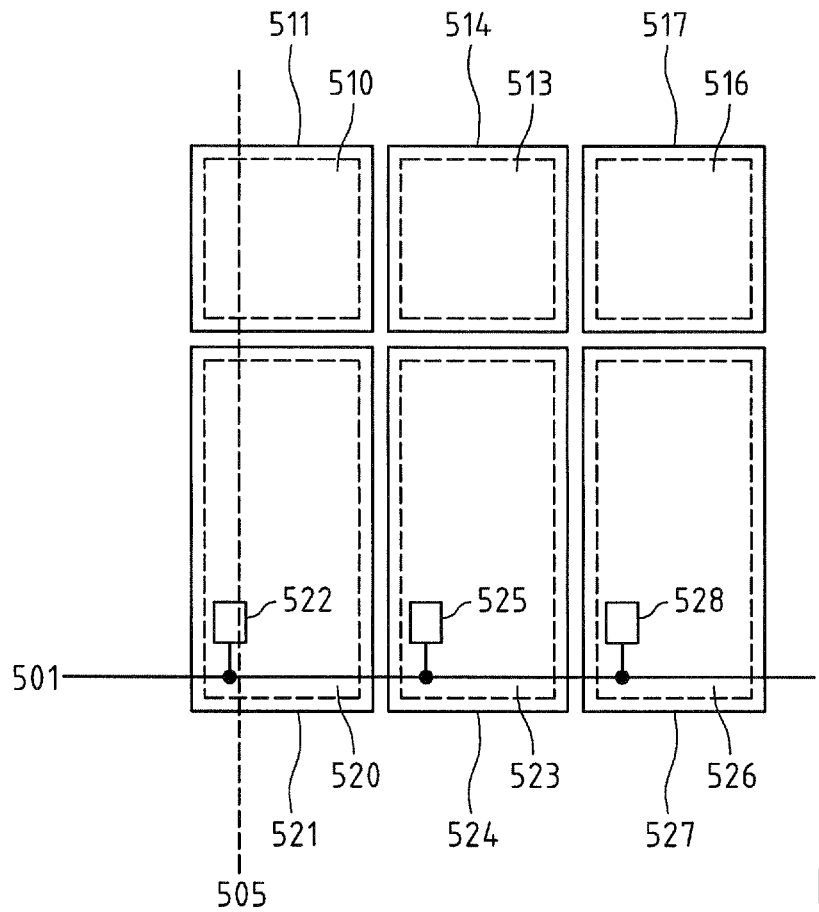
FIG. 5a: a schematic cross-sectional top-view of a fifth exemplary embodiment of the present invention.
Figure 5B:
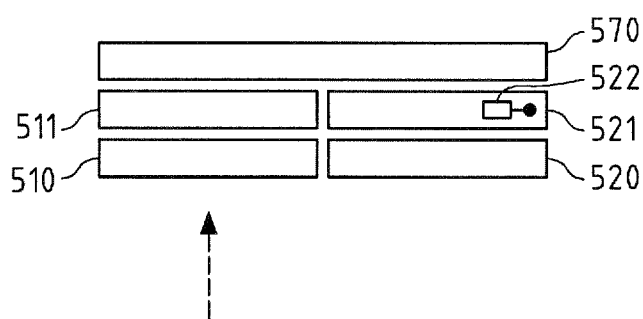
FIG. 5b: a schematic cross-sectional side-view of the fifth exemplary embodiment of the present invention.

FIGS. 5a and 5b depict a fifth exemplary embodiment of a device 500 according to the present invention. FIG. 5a depicts a top view of the device 500 and FIG. 5b depicts a cross-sectional view of an exemplary embodiment of the device 500 along line 505 in FIG. 4a.

Similar to the device 400 of the third exemplary embodiment, the device 500 comprises a first light reflective area 520, a second light reflective area 523 and a third light reflective area 526, and it comprises a first light tranmsissive area 510, a second light transmissive area 513 and a third light transmissive area 516, as depicted in FIG. 5a. These light transmissive areas 510,513,516 are configured to be coupled to a switchable backlight as aforementioned.

For instance, the first, second and third light reflective areas 520,523,526 may share a common light reflective layer, but they also may be associated with an own light reflective layer, respectively. Further, for instance, the first, second and third light transmissive areas 510,513,516 may share a common light transmissive layer, but they also may be associated with an own light transmissive layer, respectively.

In contrast to the third embodiment depicted in FIGS. 4a and 4b, the device 500 according to this fifth exemplary embodiment comprises a separate sub-pixel control element 511,514,517,521,524,527, i.e. a separate light transmission control element 511,514,517,521,524,527, for each of the light reflective areas 520,523,526 and each of the light transmissive areas 510,513,516.

Thus, by means of these separate light transmission control element 511,514,517,521,524,527 both the color sub-pixel areas associated with the light transmissive areas 510,513, 516 and the B&W sub-pixel areas associated with the light reflective areas 520,523,526 can be controlled independently from each other.

Furthermore, the device 500 comprises a single control line 501 configured to control the light transmission control elements 521,524,527 associated with the light reflective areas 520,523,526. Via this single control line 501 the connected light transmission control elements 521,524,527 can be controlled to switch the device 500 into the reflective blocking state by means of a single control signal, i.e. the light transmission control elements 521,524,527 can be switched to cause light blocking. In this reflective blocking state the single control line 501 overwrites other sub-pixel information at the respective light transmission control elements 521,524, 527 and forces these light transmission control elements 521, 524,527 to block light. For instance, each of said light transmission control elements 521,524,527 may comprise a separate switching element 522,525,528 which is configured to set the respective light transmission control elements 521, 524,527 in the reflective blocking state in response to a control signal on the single control line 501.

Thus, the device 500 can be set into the reflective blocking state in an easy way by means of the single control line 501.

For instance, if it assumed that device 500 is part of a LCD display, each of said light transmission control elements 511, 514,517,521,524,527 may represent a light transmissive electrode 511,514,517,521,524,527 configured to control an associated region of a liquid crystal element 570, as exemplarily depicted in FIG. 5b. Furthermore, for instance, each of said light transmissive electrodes 511,514,517,521,524,527 maybe associated with an electrical switching element (not depicted in FIGS. 5a and 5b) in order to electrical switch the associated electrode, e.g. in response to a control signal providing sub-pixel information for the associated sub-pixel. For instance, this electrical switching element may be a thin film transistor disposed close to the associated electrode.

Furthermore, for this assumption that device 500 is part of a LCD display, each of said separate switching element 522, 525,528 connected to the single control line 501 may represent a thin film transistor, wherein each of these thin film transistors is capable to set the respective light transmission control elements 521,524,527 in the reflective blocking state in response to a control signal on the single control line 501. For instance, in this reflective blocking state the respective light transmissive electrode 521,524, 527 may for instance be provided with a voltage that controls the regions of the liquid crystal element 570 disposed over the respective light reflective area 520,523,526 to block light independently from other control signals provided to the respective light transmissive electrode 521,524,527.

Figure 7:
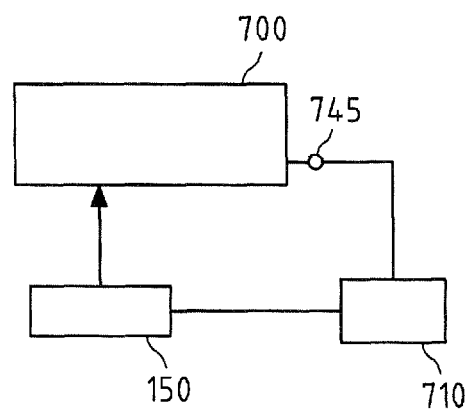
FIG. 7: a schematic diagram of an exemplary embodiment of a system of the present invention.

FIG. 7 depicts an exemplary embodiment of a system of the present invention, wherein this system comprises a display 700, wherein this display comprises at least one device according of the present invention. E.g., this device may be any out of the preceding five exemplary embodiments of the present invention depicted in FIGS. 1a-5b, or any variation thereof. This display 700 comprises a control line or control bus 745, wherein via this control line or control bus 745 each of said at least one device can be switched into the reflective blocking state.

Furthermore, at least one light source 150 is coupled to said display in order to illuminate the at least one light transmissive ares of said at least one device.

A control unit 710 is connected to the control line or control bus 745 and to the at least one light source 150 in order to activate and deactivate the reflective blocking state in response to a switching state of the at least one light source. For instance, the control unit is configured to carry out the method depicted in FIG. 6 and mentioned above.

For instance, the system depicted in FIG. 7 may be implemented in a mobile phone, a handheld device or any other suited apparatus.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

The invention claimed is:

1. A device, comprising:
    at least one light transmissive area configured to be coupled to a light source in order to be provided with backlight; and
    at least one light reflective area and at least one light transmission control element associated with said at least one light reflective area,
    wherein the at least one light transmission control element is separate from the at least one light reflective area and is located above the at least one light reflective area,
    wherein said device is configured to be switched into a reflective blocking state in response to said at least one light transmissive area being provided with backlight, and
    wherein in said reflective blocking state said at least one light transmission control element causes light to be prevented from reaching the at least one light reflective area in response to said at least one light transmissive area being provided with backlight.

2. The device according to claim 1, wherein said at least one light reflective area are at least two light reflective areas, and wherein at least two of said at least two light reflective areas are associated with one common light transmission control element of said at least one light transmission control element.

3. The device according to claim 2, wherein each of at least one of said at least two light reflective areas is deposited adjacent to one of said at least one light transmissive area, wherein said adjacent light reflective area and light transmissive area are associated with one common pixel having a common pixel light transmission control element.

4. The device according to claim 3, wherein said device comprises a liquid crystal element, and each of said at least one common pixel light transmission control element is a pixel electrode configured to control an associated region of said liquid crystal element, and wherein said common light transmission control element is a light transmissive electrode.

5. The device according to claim 3, wherein said at least one light transmissive area are at least two light transmissive areas, and wherein said at least two light reflective areas and said at least two light transmissive areas are arranged in form of a matrix in order to form a plurality of pixels, and wherein said common light transmission control element is rake-shaped and deposited above said at least two of said at least two light reflective areas.

6. The device according to claim 5, wherein said device comprises a further rake-shaped light transmission control element deposited above at least two of said at least two light transmissive areas, wherein the common light transmission control element and the further rake-shaped light transmission control element fit into each other.

7. The device according to claim 1, wherein at least one of said at least one light transmission control element represents a sub-pixel light transmission control element associated with exactly one of said at least one light reflective area.

8. The device according to claim 7, wherein the device comprises at least one further sub-pixel light transmission control element, and wherein each of said at least one further sub-pixel light transmission control element is associated with exactly one of said at least one light transmissive area.

9. The device according to claim 7, comprising a common control signal line connected to each of said at least one said sub-pixel light transmission control element in order to control said at least one sub-pixel light transmission control element causing light-blocking when the device is switched into said reflective blocking state.

10. The device according to claim 7, wherein said device comprises a liquid crystal element disposed above said at least one light transmissive area and said at least one light reflective area, and wherein said at least one light transmission control element represents light transmissive electrodes configured to control regions of said liquid crystal element.

11. The device according to claim 1, wherein a first of said at least one light transmissive area is associated with a red sub-pixel, and wherein a second of said at least one light transmissive area is associated with a green sub-pixel, and wherein a third of said at least one light transmissive area is associated with a blue sub-pixel.

12. A method, comprising:
    determining whether a reflective blocking state of a device is to be entered,
    wherein said device comprises at least one light transmissive area configured to be coupled to a light source in order to be provided with backlight and at least one light reflective area and at least one light transmission control element associated with said at least one light reflective area;
    wherein the at least one light transmission control element is separate from the at least one light reflective area and is located above the at least one light reflective area,
    wherein said reflective blocking state is entered in response to said at least one light transmissive area being provided with backlight, and
    wherein in said reflective blocking state said at least one light transmission control element causes light to be prevented from reaching the at least one light reflective area in response to said at least one light transmissive area being provided with backlight, and in case it is determined that said reflective blocking state is to be entered, switching said reflective blocking state active.

13. The method according to claim 12, wherein said determining whether said reflective blocking state of said device is to be entered comprises: determining whether backlight is switched on and in case it is determined that backlight is switched on, then it is determined to enter said reflective blocking state.

14. The method according to claim 12, further comprising: in case said blocking state is active, then determining whether backlight is switched off, and in case it is determined that backlight is switched off, switching the reflective blocking state off.

15. The method according to claim 12, wherein said at least one light reflective area are at least two light reflective areas, and wherein at least two of said at least two light reflective areas are associated with one common light transmission control element of said at least one light transmission control element.

16. The method according to claim 15, wherein each of at least one of said at least two light reflective areas is deposited adjacent to one of said at least one light transmissive area, wherein said adjacent light reflective area and light transmissive area are associated with one common pixel having a common pixel light transmission control element.

17. The method according to claim 16, wherein said device comprises a liquid crystal element, and each of at least one common pixel light transmission control element is a pixel electrode configured to control an associated region of said liquid crystal element, and wherein said common light transmission control element is a light transmissive electrode.

18. The method according to claim 16, wherein said at least one light transmissive area are at least two light transmissive areas, and wherein said at least two light reflective areas and said at least two light transmissive areas are arranged in form of a matrix in order to form a plurality of pixels, and wherein said common light transmission control element is rake-shaped and deposited above said at least two of said at least two light reflective areas.

19. The method according to claim 18, wherein said device comprises a further rake-shaped light transmission control element deposited above at least two of said at least two light transmissive areas, wherein the common light transmission control element and the further rake-shaped light transmission control element fit into each other.

20. The method according to claim 12, wherein at least one of said at least one light transmission control element represents a sub-pixel light transmission control element associated with exactly one of said at least one light reflective area.

21. The method according to claim 20, wherein the device comprises at least one further sub-pixel light transmission control element, and wherein each of said at least one further sub-pixel light transmission control element is associated with exactly one of said at least one light transmissive area.

22. The method according to claim 20, wherein the device comprises a common control signal line connected to each of said at least one said sub-pixel light transmission control element in order to control said at least one sub-pixel light transmission control element causing light-blocking when the device is switched into said reflective blocking state.

23. The method according to claim 20, wherein said device comprises a liquid crystal element disposed above said at least one light transmissive area and said at least one light reflective area, and wherein said at least one light transmission control element represents light transmissive electrodes configured to control regions of said liquid crystal element.

24. A non-transitory computer-readable medium having a computer program stored thereon, the computer program comprising instructions configured to cause a device to:
determine whether a reflective blocking state of a device is to be entered, wherein said device comprises at least one light transmissive area configured to be coupled to a light source in order to be provided with backlight and at least one light reflective area and at least one light transmission control element associated with said at least one light reflective area;
wherein the at least one light transmission control element is separate from the at least one light reflective area and is located above the at least one light reflective area,
wherein said computer program is configured to cause the device to enter the reflective blocking state in response to said at least one light transmissive area being provided with backlight, and
wherein in said reflective blocking state said at least one light transmission control element causes light to be prevented from reaching the at least one light reflective area in response to said at least one light transmissive area being provided with backlight, and in case it is determined that said reflective blocking state is to be entered, switching said reflective blocking state active.

25. A system, comprising:
at least one of the devices according to claim 1;
at least one light source, wherein said at least one light source is configured to provide backlight to at least one light transmissive area of said at least one device, and wherein said at least one light source is configured to be switched on or off; and
a control unit connected with said at least one device, wherein said control unit is configured to:
determine whether a reflective blocking state of said at least one device is to be entered, and,
in case it is determined that said reflective blocking state is to be entered, switch said reflective blocking state active.

26. The system according to claim 25, wherein said determining whether said blocking state of said device is to be entered comprises: determining whether backlight is switched on, and in case it is determined that backlight is switched on, then it is determined to enter said reflective blocking state.

27. The system according to claim 26, wherein said control unit is further configured to:
in case said blocking state is active, determining whether backlight is switched off, and
in case it is determined that backlight is switched off, switching the reflective blocking state off.

28. The device according to claim 1, wherein in the reflective blocking state the at least one light reflective area does not receive light.

* * * * *